(12) United States Patent
Hwang et al.

(10) Patent No.: US 9,956,661 B2
(45) Date of Patent: May 1, 2018

(54) FEEDBACK CONTROL NUMERICAL MACHINE TOOL AND METHOD THEREOF

(71) Applicant: Industrial Technology Research Institute, Chutung, Hsinchu County (TW)

(72) Inventors: Tsung-Ling Hwang, Chutung (TW); Tzuo-Liang Luo, Chutung (TW); Chin-Te Lin, Chutung (TW); Shuo-Peng Liang, Chutung (TW); Ta-Jen Peng, Chutung (TW)

(73) Assignee: Industrial Technology Research Institute, Chutung, Hsinchu County (TW)

( * ) Notice: Subject to any disclaimer, the term of this patent is extended or adjusted under 35 U.S.C. 154(b) by 494 days.

(21) Appl. No.: 14/582,640

(22) Filed: Dec. 24, 2014

(65) Prior Publication Data

US 2016/0144474 A1 May 26, 2016

(30) Foreign Application Priority Data

Nov. 20, 2014 (TW) .............................. 103140187 A

(51) Int. Cl.
*G06F 19/00* (2011.01)
*B23Q 15/12* (2006.01)
*G05B 19/404* (2006.01)

(52) U.S. Cl.
CPC ........... *B23Q 15/12* (2013.01); *G05B 19/404* (2013.01); *G05B 2219/41256* (2013.01)

(58) Field of Classification Search
CPC .. B23Q 15/12; B23Q 17/0976; G05B 19/404; G05B 19/4142; G05B 2219/37433;
(Continued)

(56) References Cited

U.S. PATENT DOCUMENTS 4,644,335 A * 2/1987 Wen ...................... G01H 1/003
340/680
4,821,201 A 4/1989 Kawamura et al.
(Continued)

FOREIGN PATENT DOCUMENTS

CN 101722438 A 6/2010
CN 102737646 A 10/2012
(Continued)

OTHER PUBLICATIONS

Daghini, "Improving Machining System Performance through Designed-in Damping, Modelling, Analysis and Design Solutions," Doctoral Thesis, KTH Royal Institute of Technology, Stockholm, Sweden, 99 pages (2012).
(Continued)

*Primary Examiner* — Thomas Lee
*Assistant Examiner* — Zhipeng Wang
(74) *Attorney, Agent, or Firm* — McCarter & English, LLP; Yu Lu

(57) ABSTRACT

A feedback control numerical machine tool and a method thereof are provided. The machine tool includes at least two spindles, an acoustic frequency detecting module, at least two spindle position detecting modules, and a control module. The spindles machine a workpiece. The acoustic frequency detecting module detects an acoustic frequency of the spindles when machining the workpiece. The spindle position detecting modules detects position information of the spindles when machining the workpiece. The control module acquires the acoustic frequency and the position information of the spindles, monitors whether any of the spindles chatters according to the acoustic frequency of the spindles, and performs chattering avoidance to the spindle that chatters according to the position information of the spindles. As such, the present disclosure performs chattering
(Continued)

monitoring to a plurality of spindles and avoids the chattering immediately.

18 Claims, 3 Drawing Sheets

(58) Field of Classification Search
CPC ........... G05B 2219/37435; G05B 2219/45145; G05B 2219/41256
See application file for complete search history.

(56) References Cited

U.S. PATENT DOCUMENTS

| | | | |
|---|---|---|---|
| 4,853,680 A | 8/1989 | Thomas | |
| 5,170,358 A | 12/1992 | Delio | |
| 6,614,360 B1 | 9/2003 | Leggett, III et al. | |
| 6,912,178 B2 | 6/2005 | Chu et al. | |
| 6,993,410 B2 | 1/2006 | Esterling | |
| 7,381,017 B2 | 6/2008 | Wang et al. | |
| 2002/0146296 A1* | 10/2002 | Schmitz | B23Q 17/0976 409/131 |
| 2004/0133299 A1* | 7/2004 | Goransson | B23Q 1/70 700/176 |
| 2006/0101897 A1* | 5/2006 | Masuya | B23Q 17/12 73/12.01 |
| 2006/0159538 A1* | 7/2006 | Wang | B23Q 17/0976 409/131 |
| 2006/0178771 A1* | 8/2006 | Kluft | G05B 19/4065 700/177 |
| 2010/0063609 A1* | 3/2010 | Kohring | G05B 19/4142 700/108 |
| 2012/0010744 A1 | 1/2012 | Yamashita et al. | |
| 2012/0093598 A1* | 4/2012 | Ando | B23Q 17/007 408/16 |
| 2013/0164092 A1* | 6/2013 | Kondo | G05B 19/404 409/132 |
| 2015/0306720 A1* | 10/2015 | Ono | B23Q 15/12 700/174 |

FOREIGN PATENT DOCUMENTS

| | | |
|---|---|---|
| CN | 103604492 A | 2/2014 |
| JP | 2014-083674 A | 5/2014 |
| TW | I268196 B | 9/2006 |
| TW | I289092 B | 11/2007 |
| TW | I323139 B | 4/2010 |
| TW | 201226102 A | 7/2012 |

OTHER PUBLICATIONS

DiBiase, "A High-Accuracy, Low-latency Technique for Talker Localization in Reverberant Environments Using Microphone Arrays,"; Thesis of B.S., Trinity College, (2000).
Ganguli et al., "Active damping of chatter in machine tools—Demonstration with a "Hardware in the Loop" simulator," Proceedings of the Institutions of Mechanical Engineers Part I,*Journal of Systems and Control Engineering* ,219(5):539 20 pages, (2005).
Iwamura et al., "Continuous Visualization of Nearfield Acoustic Holograsphy: A Laview Approach," 20th International Congress of Mechanical Engineering, COB09-1233 (2009).
Maynard et al., Nearfield acoustic holography: I. Theory of generalized holography and the development of NAH, Acoustical Society of America, *J. Acoust. Soc. Am.*, 78(4):1395-1439 (1985).
Moriwaki, "Trends in Recent Machine Tool Technologies," *NTN Technical Review*74:2-7 (2006).
Rajput and Deshmukh, "Prediction & Control of Chatter in Milling Machine Spindle-Tool Unit—A Review," *Int. J. Innov. Res. Sci., Eng., Tech.*, 3(4):47-52 (2014).
van Dijk et al., "Real-Time Detection and Control of Machine Tool Chapter in High Speed Milling," 2nd International Conference on "Innovative Cutting Processes and Smart Machining," 8 pages (2008).
Veronesi and Maynard, "Nearfield acoustic holography (NAH) II. Holographic reconstruction algorithms and computer implementation," *J. Acoust. Soc. Am.*, 81(5):1307-1322 (1987).
CN 102737646 English abstract.
CN 103604492A English abstract.
TW 201226102A1 English abstract.
TW I268196 English abstract.
TW I323139 English abstract.

* cited by examiner

FEEDBACK CONTROL NUMERICAL MACHINE TOOL AND METHOD THEREOF

CROSS-REFERENCE TO RELATED APPLICATIONS

This application claims foreign priority under 35 U.S.C. § 119(a) to Patent Application No. 103140187, filed Nov. 20, 2014, in the Intellectual Property Office of Ministry of Economic Affairs, Republic of China (Taiwan, R.O.C.), the entire content of which patent application is incorporated herein by reference.

BACKGROUND OF THE INVENTION

1. Technical Field

The present disclosure relates to feedback control numerical machine tools and methods thereof, and, more particularly, to a feedback control numerical machine tool and method thereof capable of avoiding chattering.

2. Description of Related Art

The traditional feedback control numeric machine tool can only deal with chattering avoidance of spindles by an offline method with numeric control program. Although the machining quality or machining process of the spindle is globally optimized, it is still necessary to monitor all the time during the spindles machine a workpiece for handling the chattering of the spindle.

Moreover, the traditional art can only perform chattering avoidance to a single spindle or shut down the feedback control numeric machine tool once the spindle chatters. Therefore, it is difficult to employ the traditional art to a feedback control numeric machine tool having a plurality of spindles. Also, it is difficult for the traditional art to allow other spindles without chattering to continuously machine the workpiece when at least one of the spindles chatters.

Further, although some of the traditional arts employ a microphone or a microphone array, those are usually utilized to detect noise, and the microphone can only support or work on a single spindle.

If the microphone or microphone array is employed in plural spindles, once at least one of the spindles chatters, the only solution of the conventional art is to shut down the machine tool, and it takes considerable time to troubleshoot the chattering of the spindle. Accordingly, the chattering cannot be avoided immediately during the machining of the spindles, such that the machining process of the spindles to the workpiece cannot be effectively reduced.

From the foregoing, how to overcome abovementioned issues raised by the traditional arts becomes the objective being pursued by persons skilled in the art.

SUMMARY OF THE INVENTION

Given abovementioned defects of the prior art, the present disclosure provides a feedback control numerical machine tool and a method thereof to monitor the chattering of a plurality of spindles at the same time and avoids the chattering immediately.

The feedback control numeric machine tool according to this disclosure comprises: at least two spindles that machine a workpiece; an acoustic frequency detecting module that detects an acoustic frequency of the spindles when machining the workpiece; at least two spindle position detecting modules that correspond to the spindles, respectively, and detect position information of the spindles when machining the workpiece; and a control module connected to the acoustic frequency detecting module and the spindle position detecting modules, that acquires the acoustic frequency and the position information of the spindles, monitors whether at least one of the spindles chatters according to the acoustic frequency of the spindles, and performs chattering avoidance to the spindle that chatters according to the position information of the spindles.

The method of feedback control numeric machine according to this disclosure comprises: detecting an acoustic frequency of at least two spindles when machining a workpiece by an acoustic frequency detecting module; detecting position information of the spindles when machining the workpiece by at least two spindle position detecting modules; and acquiring the acoustic frequency and the position information from the acoustic frequency detecting module and the spindle position detecting modules by a control module, monitoring whether at least one of the spindles is chattered by the control module according to the acoustic frequency of the spindles, and performing chattering avoidance to the spindle that is chattered by the control module according to the position information of the spindles.

From the foregoing, in the feedback control numerical machine tool and the method thereof according to the present disclosure, an acoustic frequency detecting module detects the acoustic frequency of at least two spindles when machining the workpiece, and at least two spindle position detecting units detect the position information of the spindles. Next, whether at least one of the spindles chatters is monitored according to the acoustic frequency, and chattering avoidance is performed to the spindle that chatters according to the position information.

Therefore, the present disclosure simultaneously monitors chattering of a plurality of spindles, and immediately troubleshoots and avoids the chattering when the spindles machine the workpiece. As such, the feedback control numeric machine tool can continuously operates and does not have to be shut down. Accordingly, the spindles without chattering can continuously machine the workpiece to enhance the machining efficiency, so as to effectively reduce the machining process of the spindles to the workpiece.

BRIEF DESCRIPTION OF THE DRAWINGS

The present disclosure can be more fully understood by reading the following detailed description of the exemplary embodiments, with reference made to the accompanying drawings.

DETAILED DESCRIPTION OF THE INVENTION

In the following, specific embodiments are provided to illustrate the detailed description of the present disclosure. Those skilled in the art can easily conceive the other advantages and effects of the present disclosure, based on the disclosure of the specification. The present disclosure can also be carried out or applied by other different embodiments.

Figure 1:
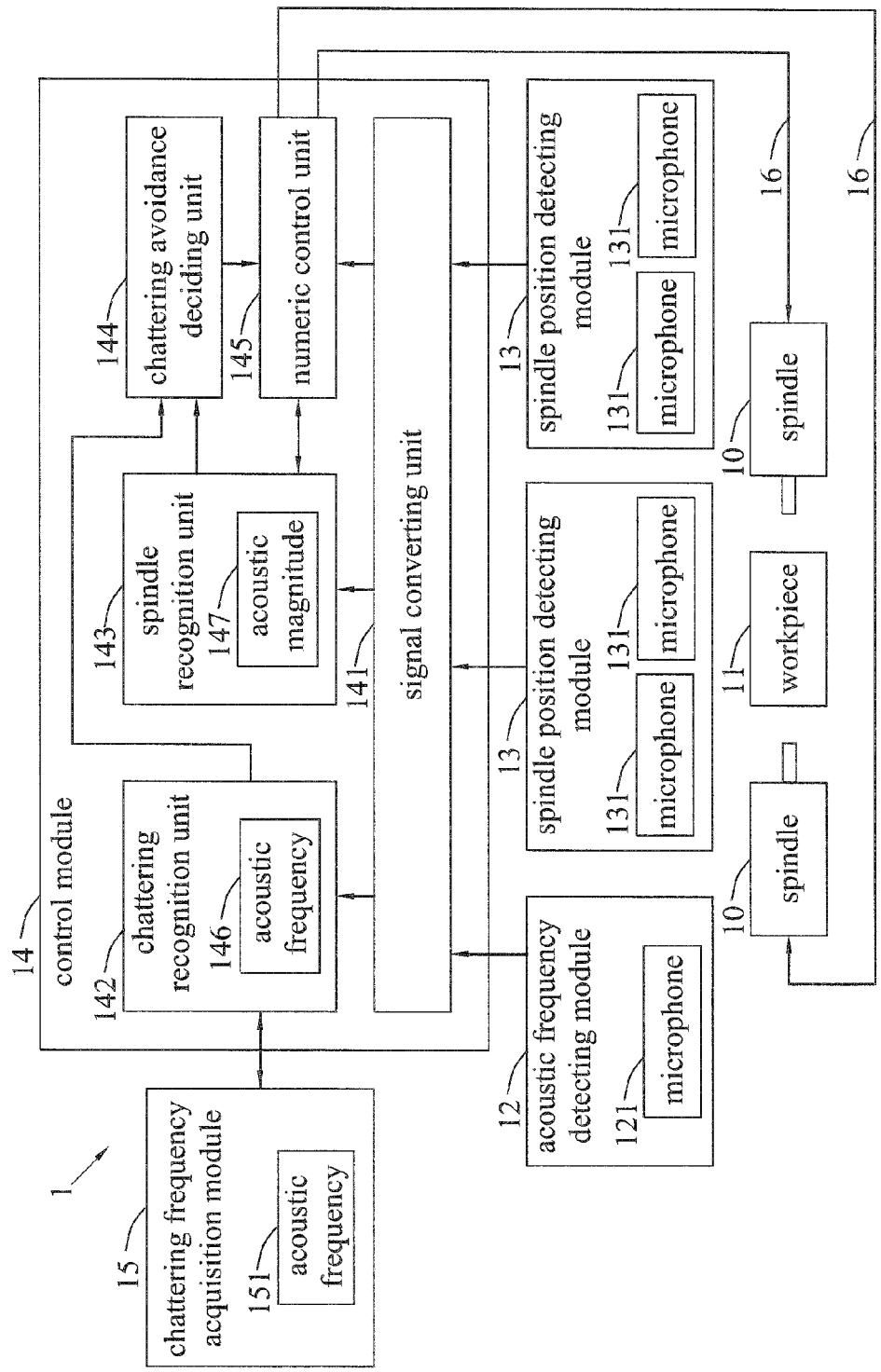
FIG. 1 is a block diagram of a feedback control numeric machine tool according to the present disclosure.
Figure 2:
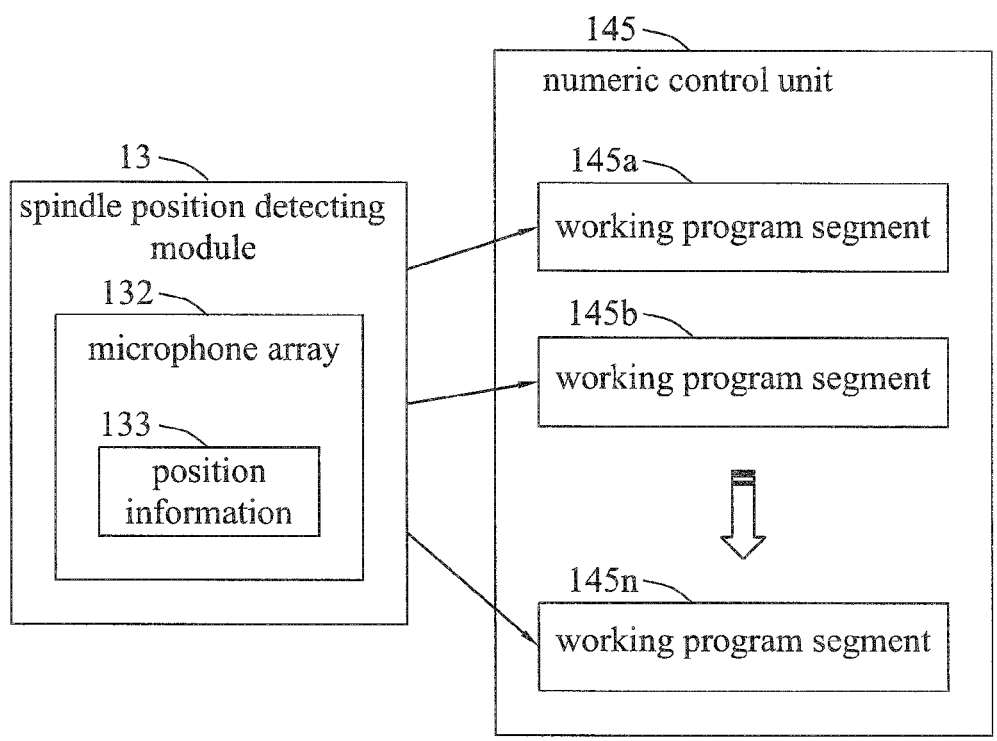
FIG. 2 is a block diagram showing that position information detected by a spindle position detecting module are connected to a plurality of working program segments of a numeric control unit according to the present disclosure.

FIG. 1 illustrates a block diagram of a feedback control numeric machine tool according to the present disclosure. FIG. 2 illustrates a block diagram showing that position information 133 detected by a spindle position detecting module 13 are connected to a plurality of working program segments 145a-145n of a numeric control unit according to the present disclosure.

As shown in FIGS. 1 and 2, a feedback control numeric machine tool 1 comprises at least two spindles 10, an acoustic frequency detecting module 12, at least two spindle position detecting modules 13, and a control module 14.

The at least two spindles 10 can be two, three or more spindles, and the at least two spindle position detecting modules 13 can be two, three or more spindle position detecting modules. The control module 14 acts as a chatter kernel, which can be software, such as a control program or a processing program, or can be hardware, such as a control unit, a controller, a control chip, a processor, or a microprocessor.

The spindles 10 are used to machine at least a workpiece 11. The acoustic frequency detecting module 12 detects the acoustic frequency or an acoustic frequency range when the spindles 10 machine the workpiece 11, and can be a sound detecting element or a sound receiving element such as a microphone 121.

The spindle position detecting modules 13 correspond to the spindles 10, respectively, and detect the position information 133 when the spindles 10 machine the workpiece 11. The position information 133 can be one, two or three dimensional space coordinates of the spindles 10, and can be an absolute position or a relative position of the spindles 10. The spindle position detecting modules 13 can be a microphone array 132 consisting of a plurality of microphones 131, and can also be other position detecting element. Also, each of the spindle position detecting modules 13 can have at least one (two, for example) microphone 131.

The control module 14 connects the acoustic frequency detecting modules 12 to the spindle position detecting modules 13, respectively, via wired signal, wireless signal or electrical signal, to acquire acoustic frequency 146 and position information 133 of the spindles. The control module 14 monitors whether at least one of the spindles 10 chatters according to the acoustic frequency 146 of the spindles 10, and performs chattering avoidance to the spindle 10 that chatters according to the position information 133 of the spindles 10.

The control module 14 may have a signal converting unit 141 that converts the acoustic frequency 146 and the position information 133 of the spindles 10 from an analog format to a digital format. The signal converting unit 141 can be an analog-to-digital converting program or an analog-to-digital converter.

The control module 14 may have a chattering recognition unit 142 that determines whether the acoustic frequency 146 of the spindles 10 is a predefined acoustic frequency 151 or within an acoustic frequency range. The predefined acoustic frequency 151 or the acoustic frequency range can be, for example, 500 Hz, 1200 Hz or 1900 Hz.

If the acoustic frequency 146 of at least one of the spindles 10 is the predefined acoustic frequency or within the acoustic frequency range, the chattering recognition unit 142 determines that at least one of the spindles 10 chatters. If none of the acoustic frequency 146 of the spindles 10 is the predefined acoustic frequency 151 or within acoustic frequency range, the chattering recognition unit 142 determines that the spindles 10 do not chatter.

The control module 14 has a spindle recognition unit 143 that recognizes a variation value of acoustic magnitudes 147 of the spindles 10, and the position information 133 of the spindles 10 are corresponded through the variation value of acoustic magnitudes 147, so as to recognize the spindle 10 that chatters from the spindles 10.

For example, as illustrated in FIG. 1, it is assumed that two spindle position detecting modules 13 at left and right sides detect two spindles 10 at left and right sides, respectively, where each of the spindle position detecting modules 13 has two microphones 131 and the acoustic magnitudes 147 of the two spindles 10 detected by the four microphones 131 are, from left to right, acoustic magnitude M1, acoustic magnitude M2, acoustic magnitude M3 and acoustic magnitude M4, respectively. The spindle 10 that chatters can be recognized from the spindles 10 by calculating a variation value of the acoustic magnitudes 147 of the four microphones 131 according to the following formulas.

$$\begin{cases} M = (M1 + M2 + M3 + M4)/4 \\ M_L = (M1 + M2)/2 - M \\ M_R = (M3 + M4)/2 - M \end{cases},$$

where M represents an average value of the acoustic magnitudes M1 to M4 of the four microphones 131 from left to right, $M_L$ represents an average value of the acoustic magnitudes M1 and M2 of the left two microphones 131 subtracting the average value M, and $M_R$ represents an average value of the acoustic magnitudes M3 and M4 of the right two microphones 131 subtracting the average value M.

Therefore, if the average value $M_L$ is larger than the average value $M_R$, the spindle that chatters should be the spindle 10 at the left. If the average value $M_L$ is larger than the average value $M_R$, the spindle that chatters should be the spindle 10 at the left. Moreover, if the average value $M_L$ is equal to the average value $M_R$, the spindles 10 are not monitored, the spindles 10 do not chatter, or the spindles 10 at the left and right chatter simultaneously.

The control module 14 may have a chattering avoidance deciding unit 144 that decides a chattering avoidance mode of the spindle 10 that chatters, and the chattering avoidance mode can adjusting a rotation speed, a feeding rate or a cutting depth of the spindle 10 that chatters.

The control module 14 may have a numeric control unit 145 such as a numeric control program, and the numeric control unit 145 may or may not have a plurality of working program segments 145a to 145n, such that the chattering avoidance mode of the spindle 10 that chatters can be adjusted by the numeric control unit 145 or the working program segments 145a to 145n. For example, the rotation speed, the feeding rate or the cutting depth of the spindle 10 that chatters can be adjusted.

The feedback control numerical machine tool 1 further comprises a chattering frequency acquisition module 15, and the chattering frequency acquisition module 15 acquires an initial value of the acoustic frequency 151 or acoustic frequency range causing the spindle 10 chatters according to a frequency response function (FRF) or a precutting method.

The frequency response function employs a static analysis for constructing a tool structure model, which can be applied to the feedback control numerical machine tool 1. Moreover, the frequency response function can establish a safe zone of the cutting depth with respect to the rotation speed of the spindles 10, and can acquire an initial value of the acoustic frequency 151 or acoustic frequency range causing the spindle 10 chatters.

Furthermore, the precutting method employs a try-and-error method, where the spindles 10 first attempt to cut the workpiece 11, then an initial value of the acoustic frequency 151 or acoustic frequency range causing the spindle 10 chatters is acquired.

The feedback control numerical machine tool 1 may comprise at least one (two, for example) signal control unit 16, and the control module 14 performs chattering avoidance to the spindle 10 that chatters through the signal control unit 16. The signal control unit 16 can be a signal control line, a wired network or a wireless network.

In addition, as shown in FIG. 2, position information 133 detected by the spindle position detecting modules 13 are connected to the numeric control unit 145 which may or may not have a plurality of working program segments.

It is assumed that the numeric control unit 145 has N working program segments such as a working program segment 145a, a working program segment 145b to a working program segment 145n, where mechanical coordinates of the spindles 10 are set in the working program segments 145a to 145n, and the position information 133 of the spindles 10 machining the workpiece 11 are connected to the mechanical coordinates of the working program segment being executed in the working program segments 145a to 145n. As such, the control module 14 can more precisely determine the spindle 10 that chatters and the position information 133 and mechanical coordinate thereof.

In an embodiment, the working program segments 145a to 145n can be uploaded by batches to adjust the chattering avoidance mode, for example, a rotation speed, a feeding rate or a cutting depth, of the spindle 10 that chatters, so as to achieve immediately optimizing the machining quality and machining process of the spindle 10 to the workpiece 11.

Figure 3:
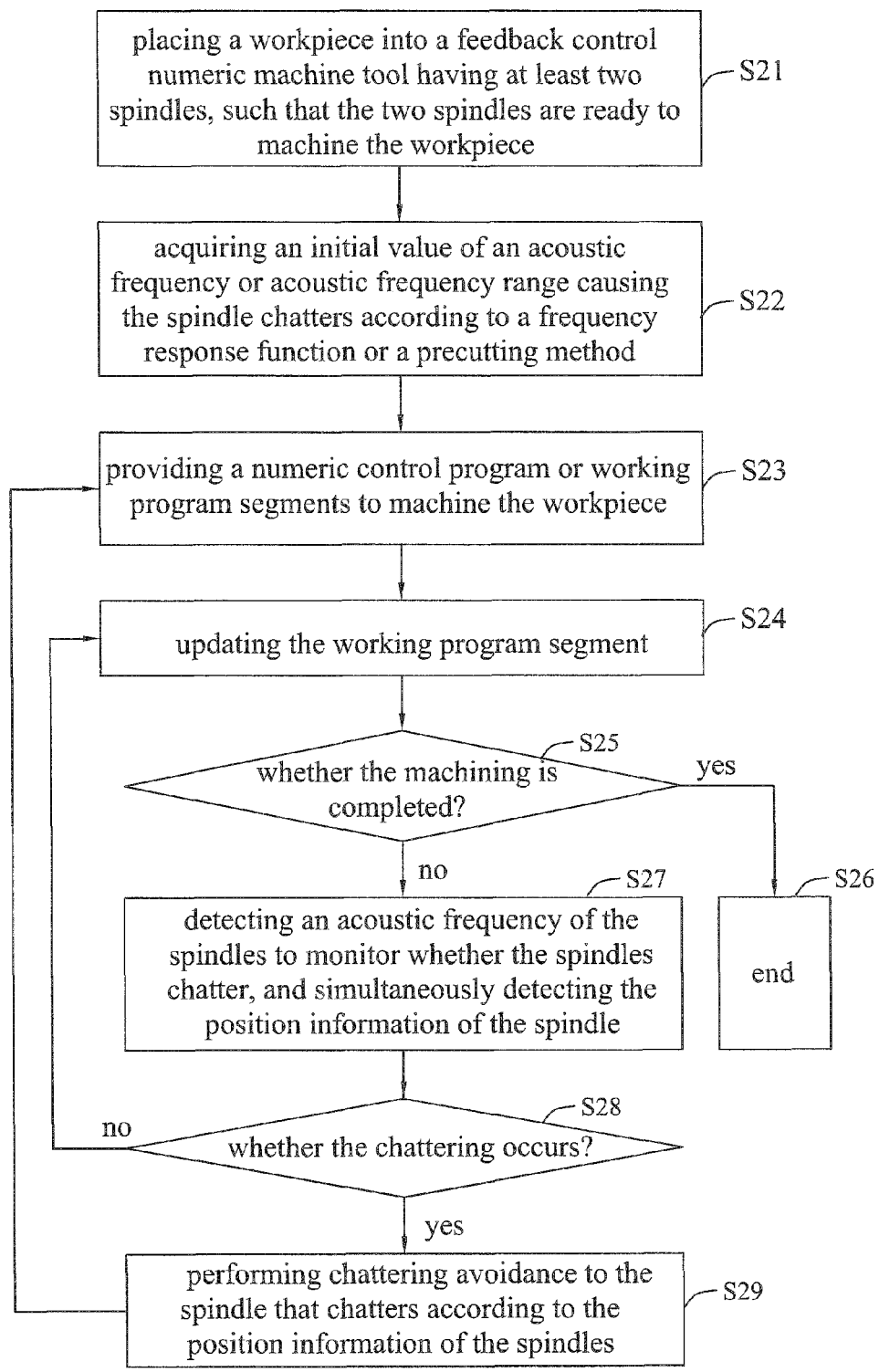
FIG. 3 is a flow chart of a method of feedback control numeric machine according to the present disclosure.

FIG. 3 is a flow chart of a method of feedback control numeric machine according to the present disclosure. Please also refer to FIGS. 1 and 2. The method of feedback control numeric machine according to the present disclosure comprises the following steps.

In step S21, a workpiece 11 is placed into a feedback control numeric machine tool 1 having at least two spindles 10, such that the two spindles 10 are ready to machine the workpiece 11. The at least two spindles 10 can be two, three or more spindles.

In step S22, an initial value of an acoustic frequency 151 or an acoustic frequency range causing the spindle 10 chatters is acquired by a chattering frequency acquisition module 15 according to a frequency response function or a precutting method.

The frequency response function employs a static analysis for constructing a tool structure model, which can be applied to the feedback control numerical machine tool 1. Moreover, the frequency response function can establish a safe zone of the cutting depth with respect to the rotation speed of the spindles 10, and can acquire an initial value of the acoustic frequency 151 or acoustic frequency range causing the spindle 10 chatters. Further, the precutting method employs a try-and-error method, where the spindles 10 first attempt to cut the workpiece 11, and an initial value of the acoustic frequency 151 or acoustic frequency range causing the spindle 10 chatters is acquired.

In step S23, a numeric control unit 145 such as a numeric control program or at least one of a plurality of working program segments 145a to 145n thereof is provided to control the spindles, such that the spindles 10 machine the workpiece 11 according to a predetermined machining sequence.

The working program segments 145a to 145n can be uploaded by batches to adjust the chattering avoidance mode, for example, a rotation speed, a feeding rate or a cutting depth of the spindle 10.

In step S24, according to the condition or chattering of that the spindles 10 machining the workpiece 11, a better or more suitable working program segment can be updated or acquired from the working program segments 145a to 145n to control the rotation speed, the feeding rate or the cutting depth of the spindles 10.

In step S25, a control module 14 is used to determine whether the workpiece 11 is completely machined. If so, the method proceeds to step S26, otherwise, the method proceeds to step S27.

In step S26, a machining process of the workpiece 11 ends.

In step S27, an acoustic frequency detecting module 12 detects an acoustic frequency 146 or an acoustic frequency range when the spindles 10 machine the workpiece 11, and at least two spindle position detecting modules 13 can simultaneously detect position information 133 when the spindles 10 machine the workpiece 11.

The acoustic frequency detecting module 12 can be a sound detecting element or a sound receiving element such as a microphone 121. The spindle position detecting modules 13 can be a microphone array 132 consisting of a plurality of microphones 131, and can also be a position detecting element. Also, each spindle position detecting module 13 can have at least one (two, for example) microphone 131. The position information 133 can be one, two or three dimensional space coordinates of the spindles 10, and can be an absolute position or a relative position of the spindles 10.

A chattering recognition unit 142 of the control module 14 is used to acquire the acoustic frequency 146 when the spindles 10 machine the workpiece 11 from the acoustic frequency detecting module 12, so as to monitor whether the spindles 10 chatter according to the acoustic frequency 146 of the spindles 10. A spindle recognition unit 143 of the control module 14 is used to acquire the position information 133 when the spindles 10 machine the workpiece 11 from the spindle position detecting modules 13.

A signal converting unit 141 of the control module 14 is used to convert the acoustic frequency 146 and the position information 133 of the spindles 10 from an analog format to a digital format. The signal converting unit 141 can be an analog-to-digital converting program or an analog-to-digital converter.

In step S28, the chattering recognition unit 142 is used to determine whether at least one of the spindles 10 chatters according to the acoustic frequency 146 of the spindles 10. If so, the method proceeds to step S29, or, the method returns to step S24.

Specifically, the chattering recognition unit 142 determines whether the acoustic frequency 146 of at least one of the spindles 10 is a predefined acoustic frequency 151 or within an acoustic frequency range acquired by the chattering frequency acquisition module 15, where the predefined acoustic frequency 151 or acoustic frequency range can be, for example, 500 Hz, 1200 Hz or 1900 Hz. If so, it is determined that at least one of the spindles 10 chatters, or it is determined that the spindles 10 do not chatter.

For example, as illustrated in FIG. 1, it is assumed that two spindle position detecting modules 13 at left and right sides detect two spindles 10 at left and right sides, respectively, where each spindle position detecting module 13 has two microphones 131 and the acoustic magnitudes 147 of the two spindles 10 detected by the four microphones 131 are, from left to right, acoustic magnitude M1, acoustic magnitude M2, acoustic magnitude M3 and acoustic magnitude M4, respectively. The spindle 10 that chatters can be recognized from the spindles 10 by calculating a variation value of the acoustic magnitudes 147 of the four microphones 131 according to the following formulas.

$$\begin{cases} M = (M1 + M2 + M3 + M4)/4 \\ M_L = (M1 + M2)/2 - M \\ M_R = (M3 + M4)/2 - M \end{cases},$$

where M represents an average value of the acoustic magnitudes M1 to M4 of the four microphones 131 from left to right, $M_L$ represents an average value of the acoustic magnitudes M1 and M2 of the left two microphones 131 subtracting the average value M, and $M_R$ represents an average value of the acoustic magnitudes M3 and M4 of the right two microphones 131 subtracting the average value M.

Therefore, if the average value $M_L$ is larger than the average value $M_R$, the spindle that chatters should be the spindle 10 at the left. If the average value $M_L$ is larger than the average value $M_R$, the spindle that chatters should be the spindle 10 at the left. If the average value $M_L$ is equal to the average value $M_R$, the spindles 10 chatter is not monitored, the spindles 10 do not chatter, or the spindles 10 at the left and right chatter at the same time.

In step S29, a chattering avoidance deciding unit 144 of the control module 14 can be used to perform chattering avoidance to the spindle 10 that chatters according to the position information 133 of the spindles 10. Then, the method returns to the step S23.

In step S29, the spindle recognition unit 143 recognizes a variation value of acoustic magnitudes 147 of the spindles 10, and the position information 133 of the spindles 10 are corresponded through the variation value of acoustic magnitudes 147, so as to recognize the spindle 10 that chatters from the spindles 10.

The chattering avoidance deciding unit 144 can decide a chattering avoidance mode of the spindle 10 that chatters, and adjust a rotation speed, a feeding rate or a cutting depth of the spindle 10 that chatters. At least one (two, for example) signal control unit 16 can be used to perform chattering avoidance to the spindle 10 that chatters. The signal control unit 16 can be a signal control line, a wired network or a wireless network.

Therefore, when the method returns to step S23, according to the chattering avoidance mode decided by the chattering avoidance deciding unit 144, the control module 14 can provide at least one of the working program segments 145a to 145n corresponding to the chattering avoidance mode to adjust the rotation speed, the feeding rate or the cutting depth of the spindle 10 that chatters through the signal control unit 16, so as to achieve immediately optimizing the machining quality and machining process of the spindle 10 to the workpiece 11.

From the foregoing, in the feedback control numerical machine tool and method thereof of the present disclosure, an acoustic frequency detecting module is used to detect the acoustic frequency during at least two spindles machine the workpiece, and at least two spindle position detecting units are used to detect the position information of the spindles.

Next, whether at least one of the spindles chatters is monitored according to the acoustic frequency, so as to perform chattering avoidance to the spindle that chatters according to the position information.

Therefore, the present disclosure simultaneously monitors chattering of a plurality of spindles, and immediately troubleshoots and avoid the chattering when the spindles machine the workpiece, such that the feedback control numeric machine tool can continuously operates and does not have to be shut down. Accordingly, the spindles without chattering can continuously machine the workpiece to enhance the machining efficiency, so as to effectively reduce the machining process of the spindles to the workpiece.

Also, the plurality of working program segments of the present disclosure can provide a plurality of chattering avoidance modes to adjust the rotation speed, feeding rate or cutting depth, of the spindle 10 that chatters, so as to achieve immediately optimizing the machining quality and machining process of the spindle to the workpiece.

The above examples are only used to illustrate the principle of the present disclosure and the effect thereof, and should not be construed as to limit the present disclosure. The above examples can all be modified and altered by those skilled in the art, without departing from the spirit and scope of the present disclosure as defined in the following appended claims.

The invention claimed is:

1. A feedback control numerical machine tool, comprising:
    at least two spindles that machine a workpiece;
    an acoustic frequency detector comprising at least one first microphone configured to detect an acoustic frequency of the at least two spindles when machining the workpiece;
    at least two spindle position detectors configured to correspond to the at least two spindles, respectively, and detect position information of the at least two spindles when machining the workpiece; and
    a processor connected to the acoustic frequency detector and the at least two spindle position detectors, and configured to acquire the acoustic frequency and the position information of the at least two spindles, monitor whether at least one of the at least two spindles chatters according to the acoustic frequency of the at least two spindles, wherein the processor has a numeric control unit, the numeric control unit includes a plurality of working program segments having mechanical coordinates of the at least two spindles, and the working program segments having the mechanical coordinates are uploaded by batches to perform chattering avoidance,
    wherein the numeric control unit configured to perform the chattering avoidance by adjusting a rotation speed, a feeding rate or a cutting depth of the spindle that chatters according to the position information of the at least two spindles.

2. The feedback control numerical machine tool of claim 1, wherein the at least two spindle position detectors are a microphone array consisting of a plurality of second microphones.

3. The feedback control numerical machine tool of claim 1, wherein the processor has a signal converting unit configured to convert the acoustic frequency and the position information of the at least two spindles from an analog format to a digital format.

4. The feedback control numerical machine tool of claim 1, wherein the processor has a chattering recognition unit configured to determine whether the acoustic frequency of the at least two spindles is a predefined acoustic frequency or within an acoustic frequency range, and determine that at least one of the at least two spindles chatters when determining that the acoustic frequency of the at least two spindles is the predefined acoustic frequency or within the acoustic frequency range.

5. The feedback control numerical machine tool of claim 1, wherein the processor has a spindle recognition unit configured to recognize a variation value of acoustic magnitudes of the at least two spindles, and the spindle that chatters according to the position information of the at least two spindles that corresponds to the variation value of acoustic magnitudes.

6. The feedback control numerical machine tool of claim 1, wherein the processor has a chattering avoidance deciding unit configured to decide a chattering avoidance mode of the spindle that chatters.

7. The feedback control numerical machine tool of claim 1, wherein the numeric control unit is configured to adjust a chattering avoidance mode of the spindle that chatters.

8. The feedback control numerical machine tool of claim 1, further comprising a chattering frequency acquisition module connected to the processor and configured to adjust an initial value of the acoustic frequency or an acoustic frequency range causing the spindle chatters according to a frequency response function or a precutting method.

9. The feedback control numerical machine tool of claim 1, further comprising at least one signal control unit connected to the processor and the at least two spindles, and configured to allow the processor to perform chattering avoidance to the spindle that chatters through the signal control unit.

10. A method of feedback control numerical machine, comprising:
   detecting an acoustic frequency of at least two spindles when machining a workpiece by an acoustic frequency detector comprising at least one first microphone;
   detecting position information of the at least two spindles when machining the workpiece by at least two spindle position detectors;
   acquiring the acoustic frequency and the position information from the acoustic frequency detector and the at least two spindle position detectors by a processor, monitoring whether at least one of the at least two spindles is chattered by the processor according to the acoustic frequency of the at least two spindles, wherein the processor has a numeric control unit, the numeric control unit includes a plurality of working program segments having mechanical coordinates of the at least two spindles, and the working program segments having the mechanical coordinates are uploaded by batches to perform chattering avoidance; and
   performing the chattering avoidance by adjusting a rotation speed, a feeding rate or a cutting depth of the spindle that chatters according to the position information of the at least two spindles.

11. The method of claim 10, wherein the at least two spindle position detectors are a microphone array consisting of a plurality of second microphones.

12. The method of claim 10, further comprising converting the acoustic frequency and the position information of the at least two spindles from an analog format to a digital format.

13. The method of claim 10, further comprising determining whether the acoustic frequency of the at least two spindles is a predefined acoustic frequency or within an acoustic frequency range, and determining that at least one of the at least two spindles chatters if the acoustic frequency of the at least two spindles is determined to be the predefined acoustic frequency or within the acoustic frequency range.

14. The method of claim 10, further comprising recognizing a variation value of acoustic magnitudes of the at least two spindles, and recognizing the spindle that chatters according to the position information of the at least two spindles that corresponds to the variation value of acoustic magnitudes.

15. The method of claim 10, further comprising deciding a chattering avoidance mode of the spindle that chatters by a chattering avoidance deciding unit.

16. The method of claim 10, further comprising adjusting a chattering avoidance mode of the spindle that chatters by the numeric control unit.

17. The method of claim 10, further comprising acquiring an initial value of the acoustic frequency or an acoustic frequency range causing the spindle chatters according to a frequency response function or a precutting method.

18. The method of claim 10, further comprising performing chattering avoidance to the spindle that chatters by at least one signal control unit.

* * * * *